Figure 1:
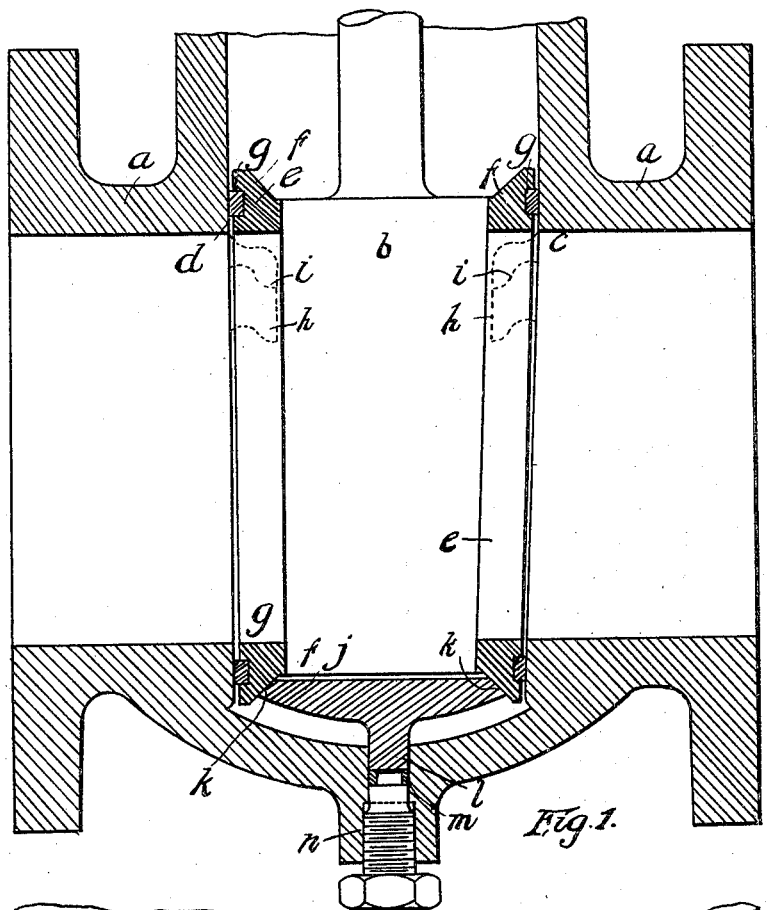

No. 769,831. PATENTED SEPT. 13, 1904.
J. E. L. OGDEN.
SECURING VALVE SEATS.
APPLICATION FILED NOV. 2, 1903.
NO MODEL. 6 SHEETS—SHEET 1.

Witnesses:
Jas. C. Wolrensmith.
Henry E. Evrding.

Inventor:
John E. L. Ogden,
By J. Walter Douglass
Attorney

No. 769,831. PATENTED SEPT. 13, 1904.
J. E. L. OGDEN.
SECURING VALVE SEATS.
APPLICATION FILED NOV. 2, 1903.
NO MODEL. 6 SHEETS—SHEET 2.
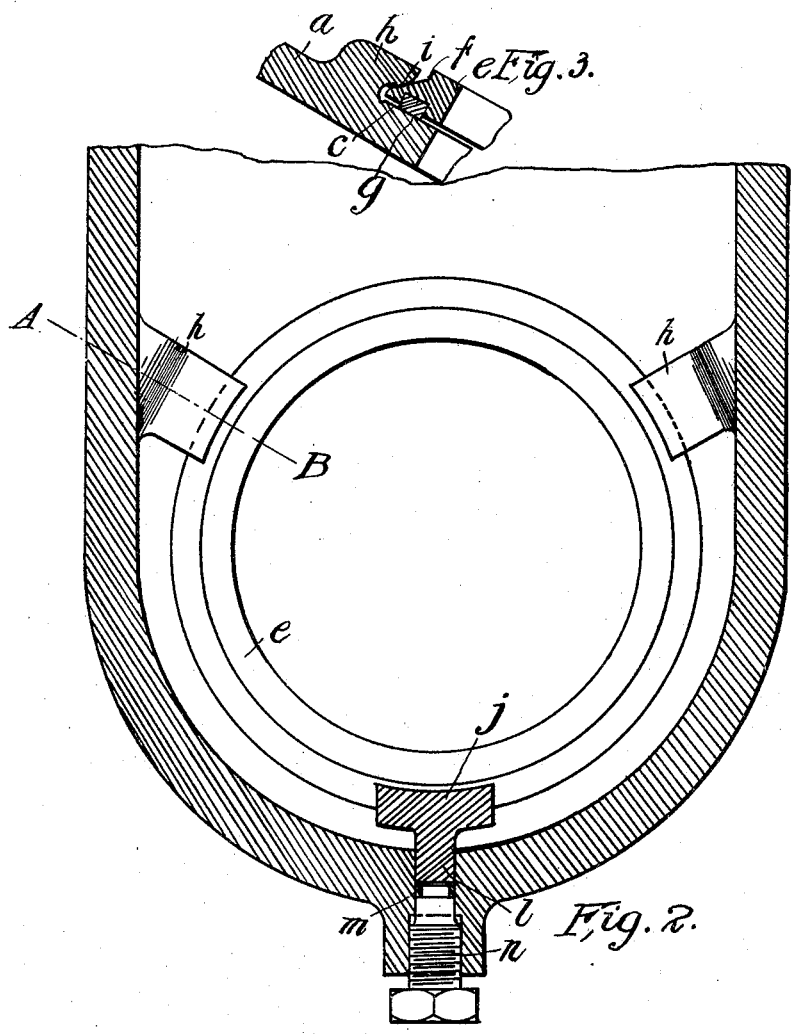

No. 769,831. PATENTED SEPT. 13, 1904.
J. E. L. OGDEN.
SECURING VALVE SEATS.
APPLICATION FILED NOV. 2, 1903.
NO MODEL. 6 SHEETS—SHEET 3.
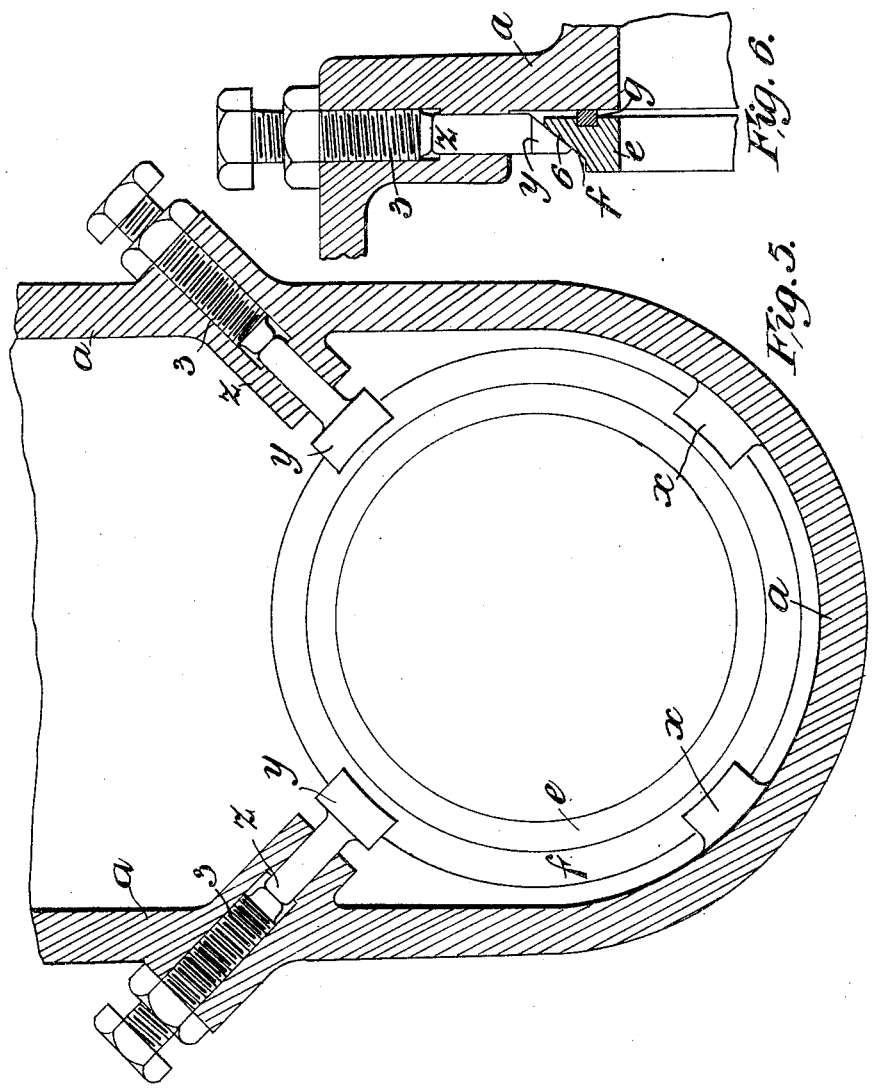
Witnesses:
Jas. C. Wobrsmith.
Henry E. Evrding.
Inventor:
John E. L. Ogden,
By J. Walter Douglass
Attorney

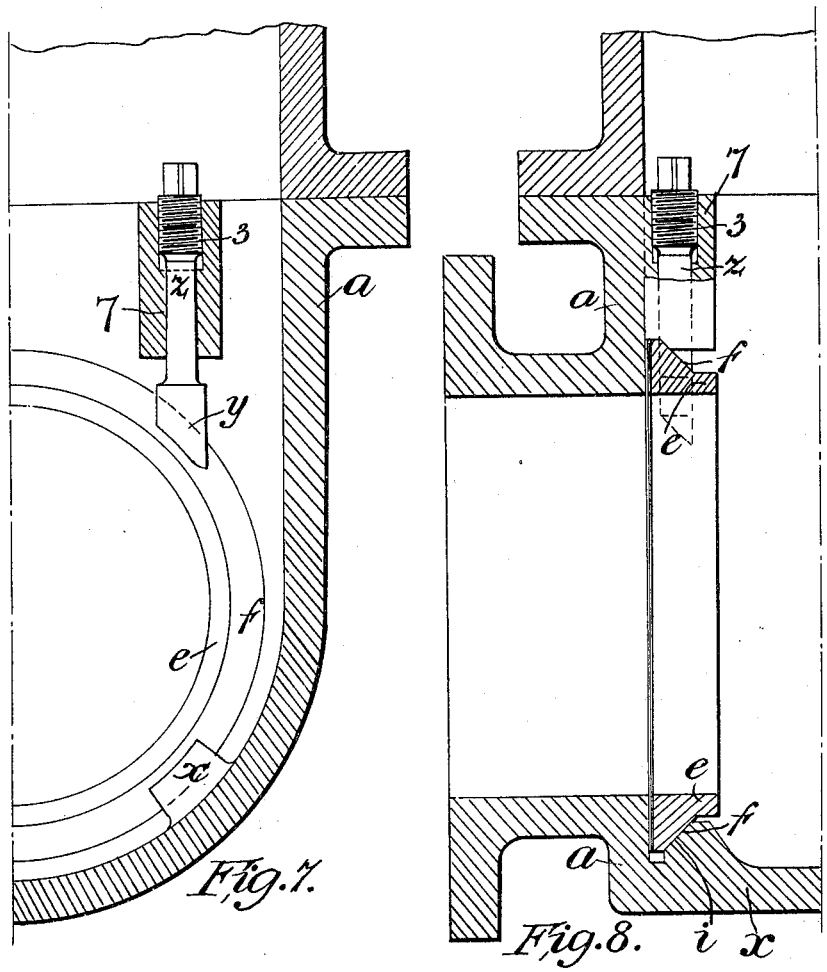

No. 769,831. PATENTED SEPT. 13, 1904.
J. E. L. OGDEN.
SECURING VALVE SEATS.
APPLICATION FILED NOV. 2, 1903.
NO MODEL. 6 SHEETS—SHEET 6.

Witnesses:
Jas. C. Wohnsmith.
Henry E. Evriding.

Inventor:
John E. L. Ogden,
By J. Walter Douglas
Attorney.

No. 769,831. Patented September 13, 1904.

UNITED STATES PATENT OFFICE.

JOHN EDWARD LEWIS OGDEN, OF LISCARD, ENGLAND.

SECURING VALVE-SEATS.

SPECIFICATION forming part of Letters Patent No. 769,831, dated September 13, 1904.

Application filed November 2, 1903. Serial No. 179,454. (No model.)

*To all whom it may concern:*

Be it known that I, JOHN EDWARD LEWIS OGDEN, a subject of the King of Great Britain and Ireland, and a resident of Penshurst, Lincoln Drive, Liscard, in the county of Chester, England, have invented certain new and useful Improvements in Securing Valve-Seats, (for which I have made application for Letters Patent in Great Britain, No. 24,254, dated November 5, 1902, and in Germany, application filed November 17, 1902,) of which the following is a specification.

This invention relates to the holding down or securing of removable or renewable valve-seats.

My invention has for its object to provide means for holding the seats securely and rigidly in place and at the same time allowing these seats to be conveniently put in position and removed.

My invention is of special value upon valves intended to be used with steam of a high temperature or superheated steam, although I do not confine the application of my improvements to any particular type of valve-casing or valve-seat or to any special purposes for which the valve is to be employed.

Removable seats have before the date of my present invention been secured to the valve-casing by screwing them into the casing or by the action of wedges which retain them in place. The first method is objectionable on account of the difficulty of cutting a satisfactory thread on the valve-casing and of the difficulty of removing the seat when required. As regards the latter method, as far as I am aware, the wedges have been so shaped and so used that it is difficult to get the valve-seat held to the valve-casing at all points on its circumference, and if this is not done the valve-seat, unless made very heavy, is liable to leak between the points at which the holding-down force is applied.

My invention consists in a device for securing or holding down valve seats or rings by the combined action of snugs and of screwed pins, (or of studs or bridge-pieces actuated by screwed pins), the said snugs and the said pins, studs, or bridge-pieces operating with a wedge-like action on the beveled periphery of the valve-seat in such a manner that the screwed pins with one motion produce the double effect of forcing the valve-seat into contact with the snugs and at the same time force the parts of the valve-seat on which they directly act against the valve-casing.

By the use of my invention the one act of screwing in the pins secures the valve-seat at several points round its periphery. At the same time the circumference of the seat is not directly in contact with the casing, and the seat is thus not restrained from expanding under the influence of heat to the same extent as is usually the case. Further, the valve-seat is very easily removed when this is desired.

The accompanying drawings illustrate my invention in several forms.

In Figures 1 and 2, which are two cross-sections of the valve-casing at right angles to each other, $a$ is the valve-casing and $b$ is the valve, which has a vertical movement. The valve is shown in its closed position and is opened by giving it a vertical movement—that is, a sliding motion over the valve-seats $e$ $e$. The left-hand seat $e$ is shown parallel to the line of motion of $b$, while the right-hand seat is shown slightly inclined to this. This is done simply to illustrate two arrangements of valve-seat, either of which may be employed. The valve-seats $e$ are made with beveled edges $f$ and are provided with rings $g$, which may be of some material which is soft compared with the material of the seats and of the valve-casing. These rings $g$ are intended to make a steam-tight connection between the seats $e$ and the surfaces $c$ and $d$ of the valve-casing $a$. Attached to the valve-casing on either side are snugs $h$, having inclined inner surfaces $i$, which act on the beveled surfaces of the valve-seats.

The detail drawing, Fig. 3, which is a section on the line A B of Fig. 2, shows clearly the construction of snugs and their action on the bevel-face of the seat. It will be seen that if an upward motion is given to either seat $e$ there will be a wedge-like action between the surfaces $f$ and the surfaces $i$ of the snugs which will force the seat strongly against the face $c$ (or $d$) of the casing. This upward motion is given to each seat by means of the pin $n$, which screws into a hole cut in the valve-casing. Into the inner end of this hole projects the stem $l$ of a bridge-piece $j$, which has inclined faces $k$, which act on the beveled edges $f$ of the valve-seats. Packing $m$, which may be a ring of asbestos, copper, or other suitable material, is placed between the end of the pin $n$ and the stem $l$ of the bridge-piece. The end of the pin may be conveniently turned down, as shown in the drawings, so as to form a shoulder against which the ring $m$ can press. I may, however, shape the end of the pin $n$ and the end of the stem $l$ and arrange the packing in any convenient manner. (Slightly-modified arrangements are shown in the subsequent figures.) The upward pressure of the bridge-piece $j$ against the valve-seats presses these upward against the snugs $h$, and owing to the inclined nature of the surfaces $i$ and $f$ (see Fig. 3) the valve-seats, at their upper ends, will be firmly pressed against the casing. The bridge-piece $j$ has also another action on the seats $e$, for owing to the inclined nature of the faces $f$ of the valve-seat the upward motion of the bridge-piece $j$, caused by the screwed pin $n$, will, by a wedge-like action, force the bottom parts of the seats $e$ against the valve-casing. The pin $n$ and bridge-piece $j$ therefore serve a double purpose, and this is, in fact, the essence of my invention.

Figure 4:
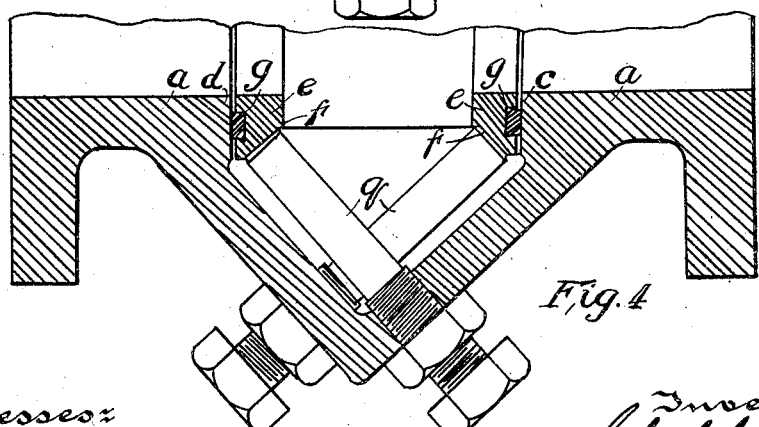

A modified form of my device is shown in Fig. 4. Two screwed pins $q$ are here substituted for the screwed pin $n$. These pins $q$ are inclined to the plane of the valve-seats and normal to the beveled edges $f$, so that when they are screwed inward against the sides they not only force the seats upward, so as to be acted on by the snugs, but also press the lower parts of the seats against the faces $c$ and $d$ of the valve-casing.

In the form of my device shown in Figs. 5 and 6 the screwed pins 3 act on the plungers or studs $z$, having end pieces $y$, which have beveled faces 6. The pins 3 move in a plane parallel to that of the valve-seat $e$; but the inclined faces 6 of the studs not only force the seat $e$ downward, so as to be acted on by the snugs $x$, but also press the top of the seat against the top of the valve-casing. The snugs $x$ are of a similar nature to the snugs $h$ shown in Figs. 1, 2, and 3.

Instead of placing the pins 3 3, as shown in Fig. 5, at ninety degrees to each other and at forty-five degrees to the sides of the valve-casing I may place them opposite to and in line with each other and at ninety degrees to the sides of the valve-casing, or I may place them at any suitable angle. This is only a matter for convenience. I arrange the inclined faces 6 to suit the beveled edges of the valve-seat whatever be the angle of the pins 3.

Instead of passing the pins 3 through the valve-casing, so as to be actuated from the outside of the casing, I may screw them into holes in snugs or projections 7, Figs. 7 and 8, cast on the valve-casing, so that the pins are manipulated from the inside of the casing. I do not consider this construction generally so good as passing the pins right through the casing; but in some cases it may be desirable to adopt the construction shown in Figs. 7 and 8. The angular position of the pins 3 is only a matter of convenience.

Figures 9, 10:
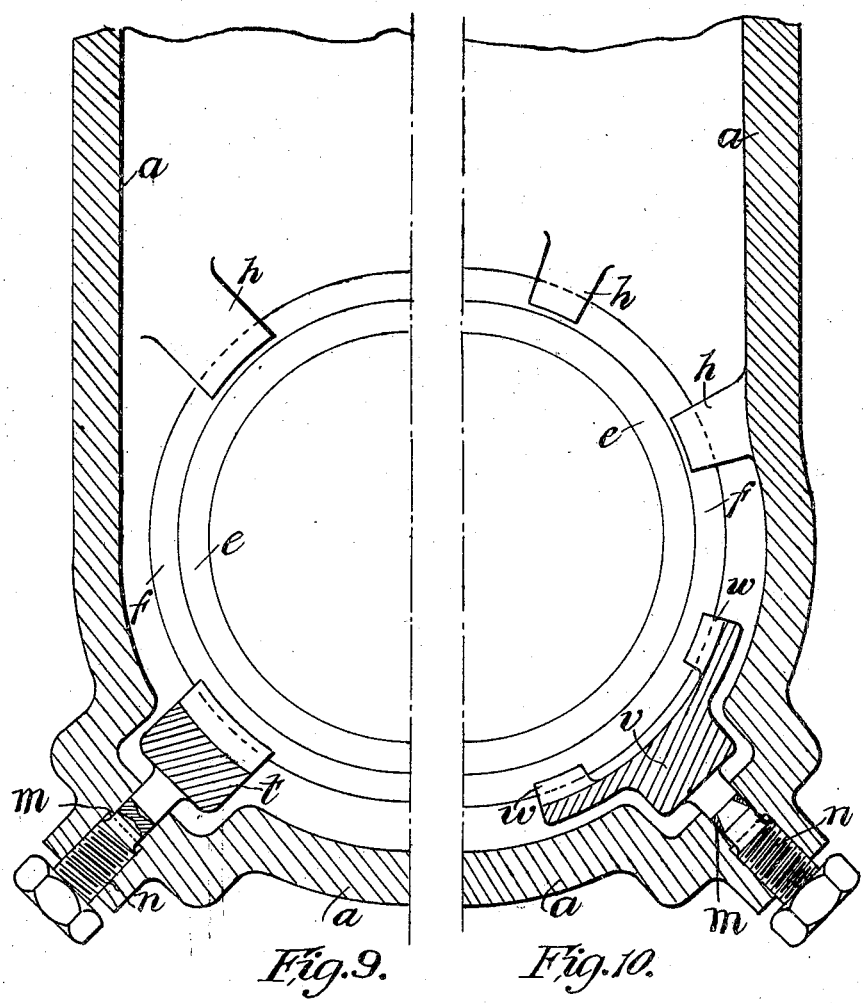

The form of my device shown in Fig. 9 is the same as that shown in Figs. 1, 2, and 3, but I use two bridge-pieces $t$ instead of the one bridge-piece $j$. It will be understood that although only half of the valve casing, seat, &c., is shown the other half is the same.

In the form of my device shown in Fig. 10 I again use two bridge-pieces, which are here lettered $v$. These bridge-pieces, however, in this case act on the valve-seat in two places. To obtain this action, the bridge-piece $v$ has at each end two projections $w$. Each of these projections $w$ is of the nature of the single end $k$ of the bridge-piece $j$ shown in Figs. 1 and 2. In this form of my device which is intended for large valves there are also four snugs $h$ instead of two.

Although I have shown the faces $f$ of the seats as conical, I can make these faces of conoidal form, if desired, and I can make the bearing-surfaces $i$ and $k$ of the snugs and bridge-pieces with either a straight or a curved bevel. The surfaces $f$ of the seat are shown curved in Fig. 11, which will now be referred to.

Although I have up till now illustrated my invention as applied to sluice-valves or valves which move at right angles to the axes of their seats, my invention may be applied to other kinds of valves.

Figure 11:
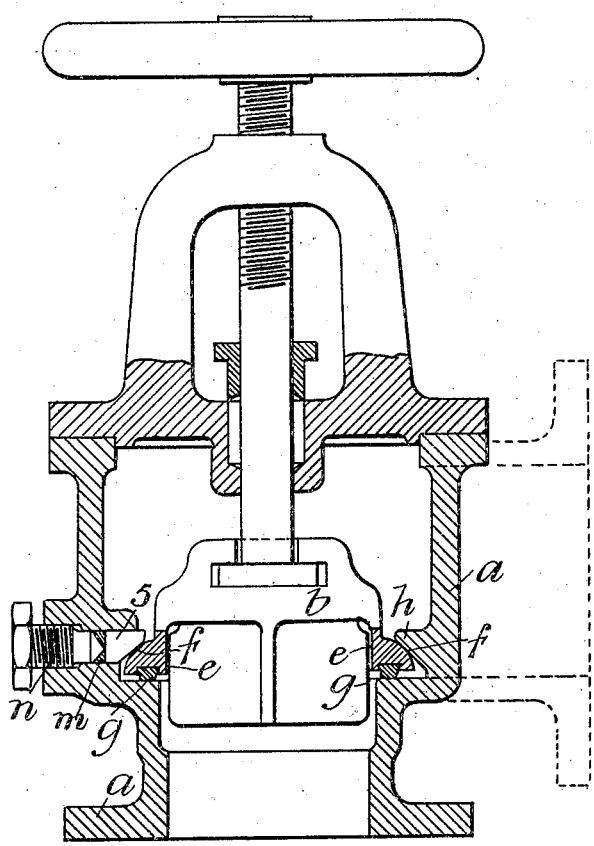

Fig. 11 shows by way of example my invention as applied to an ordinary screw-down valve. $a$ is the valve-casing, $b$ the valve, and $e$ the valve ring or seat. The end $m$ of the screwed pin $n$ engages with the stud 5, which not only forces the valve-seat against the snugs $h$, but also presses the part of the seat with which it makes contact against the casing.

I may in all cases where thought desirable make the snugs to be adjustable, so that they can be regulated when desired, so that the valve will when closed occupy a known and desired position within the casing.

Figure 12:
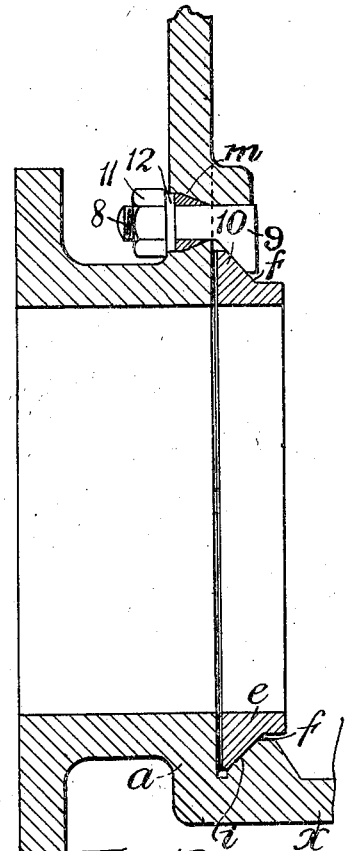

Referring now to Fig. 12, the screws 8, which in this case are employed to act in tension, are provided with surfaces 9, having beveled faces 10, which act on the beveled face $f$ of the valve-seat. The snugs $h$ are formed with beveled faces $i$, the same as in the previous cases. The screw 8 is tightened up by means of a nut 11, and the packing $m$ is conveniently secured by a washer 12. This construction may be used either with a sluice-valve or with an ordinary screw-down valve like that shown in Fig. 11.

Having now described my invention, what I claim as new, and desire to secure by Letters Patent, is—

1. In combination, valve-seats having beveled edges, snugs adapted to engage with these beveled edges, a bridge-piece adapted to engage at one end with the beveled edge of one valve-seat and at the other end with the beveled edge of the other valve-seat and a screwed pin adapted to actuate the bridge-piece so as to produce the double action on the valve-seats, substantially as described.

2. In combination, a valve-seat such as $e$ having a beveled edge such as $f$, snugs such as $h$ adapted to engage with said beveled edge and bridge-pieces such as $v$ provided with projections such as $w$, of which two bear against one valve-seat and the other two against the other valve-seat, the said bridge-pieces being adapted to be pressed against the valve-seats by screwed pins such as $n$ which pass through and are adapted to be operated from the outside of the valve-casing, substantially and described.

In witness whereof I have hereunto set my hand in presence of two witnesses.

JOHN EDWARD LEWIS OGDEN.

Witnesses:
ROBERT MORRISON NEILSON,
VIVIAN ARTHUR HUGHES.